United States Patent

[11] 3,623,609

[72] Inventor John A. Ainlay
 3330 Grant St., Evanston, Ill. 60201
[21] Appl. No 881,396
[22] Filed Dec. 2, 1969
[45] Patented Nov. 30, 1971

[54] SKIMMER FOR SEPARATING FLOWING LIQUIDS FROM WATER
17 Claims, 7 Drawing Figs.

[52] U.S. Cl. .... 210/242, 210/DIG. 21
[51] Int. Cl. .... C02b 9/02
[50] Field of Search .... 210/83, 242, 523, DIG. 5, 40

[56] References Cited
UNITED STATES PATENTS

| | | | |
|---|---|---|---|
| 3,219,190 | 11/1965 | Thune | 210/523 |
| 1,591,024 | 7/1926 | Dodge | 210/242 |
| 3,237,774 | 3/1966 | Schuback | 210/242 |
| 2,876,903 | 3/1959 | Lee | 210/242 |
| 3,403,098 | 9/1968 | Hirs | 210/40 |

Primary Examiner—Reuben Friedman
Assistant Examiner—T. A. Granger
Attorney—Pendleton, Neuman, Williams & Anderson ABSTRACT: A floating, seagoing skimmer has a separating chamber communicating at its lower end with the body of water into which it is placed, a weir at the front of the chamber having a forwardly extending curved surface which terminates in a skimming edge and a rotating vaned impeller whose path of movement is disposed relatively closely to the curved surface of the weir so as to carry the combined floating liquid and water over the weir and into the separating chamber. The top of the weir is substantially above the water surface so as to create a hydrostatic head for causing waterflow out of the bottom of the chamber and the number of vanes in the impeller, its speed of rotation and its depth of penetration are such as to move the combined floating liquid and water with a minimum of turbulence. The skimming edge ahead of the weir is adapted to be held somewhat below the interface of the floating liquid and water surface.

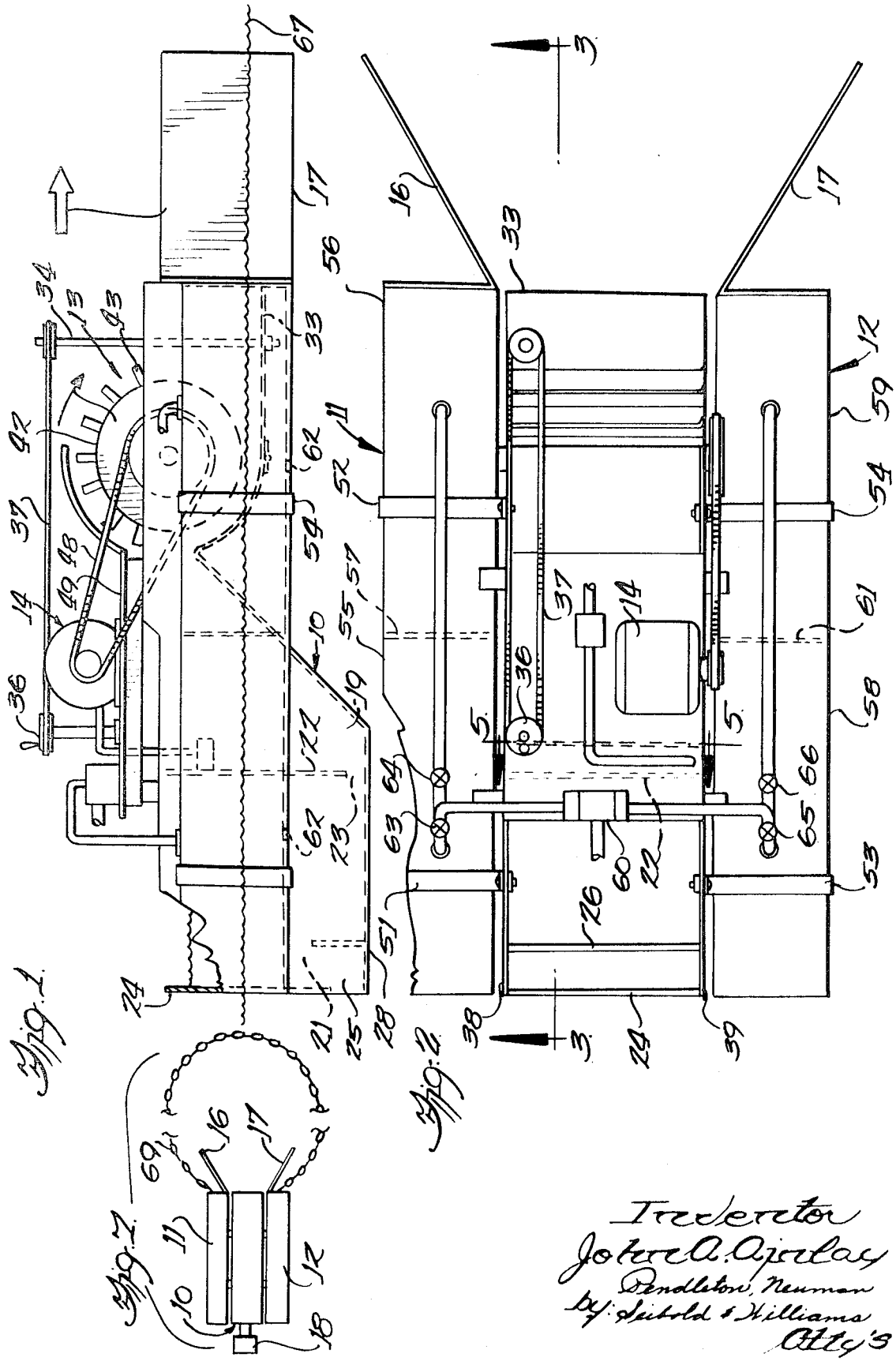

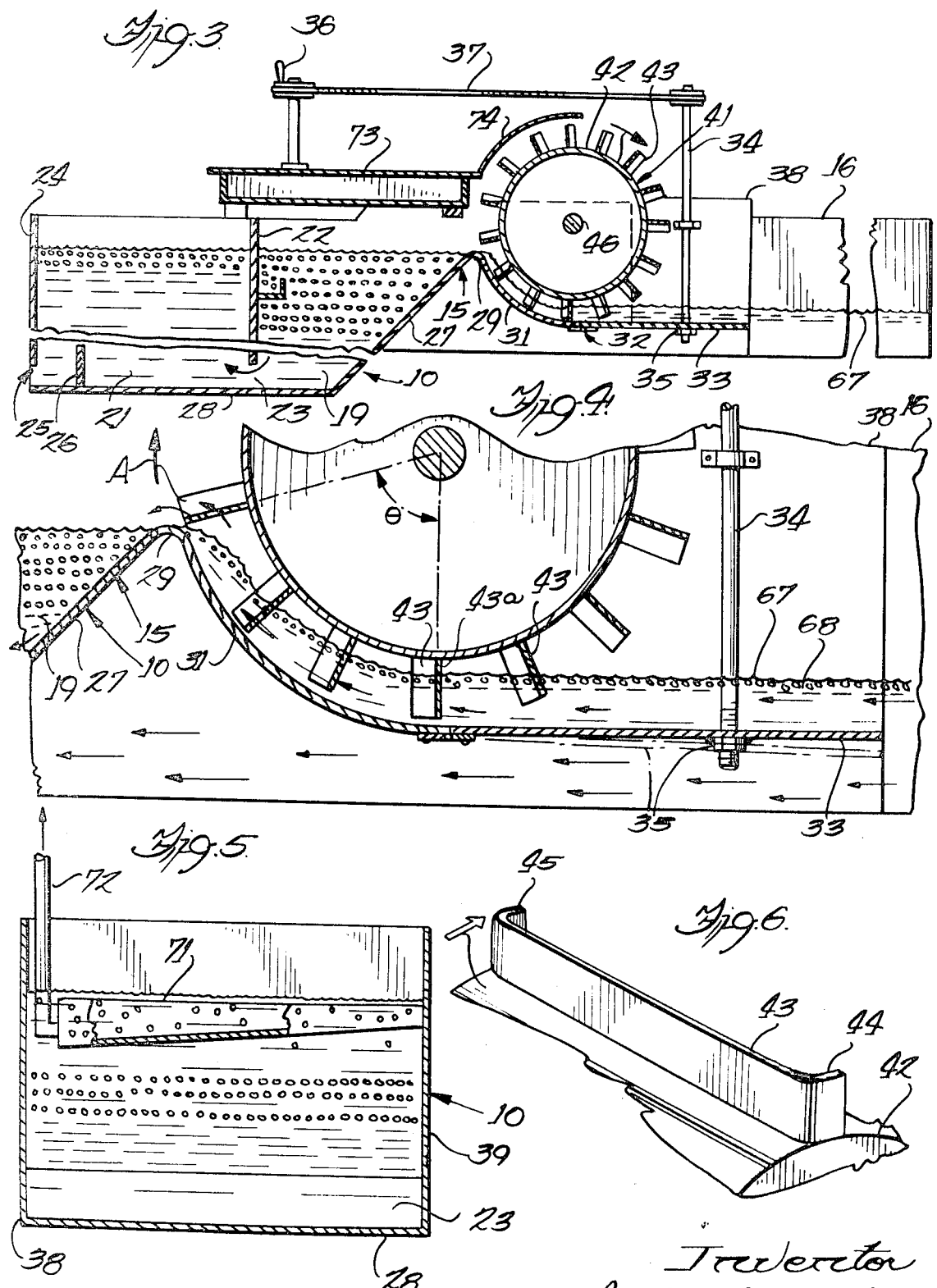

SKIMMER FOR SEPARATING FLOWING LIQUIDS FROM WATER

BACKGROUND OF THE INVENTION

The invention relates to a device for skimming a floating liquid from the body of water on which it is floating, and, more particularly, to such a device wherein the skimming edge picks up an effective minimum amount of water as a vehicle for the floating liquid, and it is an object of the invention to provide an improved device of this character.

Man has become very conscious of his environment and of his contamination of it. The consequences of not preventing contamination are ever more readily apparent, leading to a sustained effort by governmental and private agencies and people generally to prevent contamination and to remove the contaminants after they have been released. This effort is of particular point in the case of streams, lakes and other bodies of water which are subject to spillage therein of floating liquids such as oil, gasoline, other liquid hydrocarbons, and the like. The bodies of water subject to contamination may be large or small and are many in number. Devices for skimming, accordingly, should be efficient in use, easily transportable, available in large and small sizes to fit the circumstances, and inexpensive to make.

Prior art devices for separating, or skimming, oil from water are known, as in U.S. Pat. Nos. 3,219,190 Thune, 3,314,540 Lane, 2,876,903 Lee, 2,891,672 C. In't Veld et al., 2,497,177 McClintock et al., 1,591,024 Dodge, and 1,573,085 Meiani. These devices have not effectively solved the skimming problem. Picking up too much water in the skimming process, creating too much turbulence of the oil and water, inability to simply enable the oil and water to separate and for the separated water to return to the water body, and generally overall inefficiency individually and together have been problems of the prior art.

It is a further object of the invention to provide a skimming device of the nature indicated which is simple in form, easy to make and operate, adaptable to different circumstances and efficient in operation.

Other objectives and advantages of the invention will become apparent as the description proceeds.

SUMMARY OF THE INVENTION

In carrying out the invention in one form, there is provided apparatus for separating liquid floating on the surface of a body of water from the water and returning the separated water to the body of water, comprising a separating chamber for disposition in such body of water and having an upper portion and a lower portion, said upper portion being adapted to be above the surface of the body of water by a predetermined amount and said lower portion being adapted to be maintained below the surface of said body of water by a predetermined amount, said chamber being in communication at its lower portion with said body of water, a weir terminating the forward side of said chamber and having an upper edge which is adapted to be disposed a predetermined distance above the surface of said body of water to provide a hydrostatic head in said chamber for causing flow of water out of said chamber through said communication, said chamber and at least a portion of said body of water being movable relative to each other whereby the direction of relative water movement is over the upper edge of said weir and into said chamber, a rotatable impeller having transverse radial vanes thereon and having an axis transversely of said direction of movement attached to said chamber forwardly of said weir for impelling said floating liquid and water over said weir and into said chamber, means for relatively nonturbulently rotating said impeller, said weir having a forwardly directed surface extending approximately to the path of said radial vanes, the axis of said impeller being located such that said vanes just easily clear the said forwardly directed surface of said weir, and the forward edge of said weir being adapted to be disposed an effective minimum distance below the interface of said floating liquid and said body of water.

More specifically, the forward surface of the weir is formed with a radius approximately equal to that of the radial vanes of the impeller.

BRIEF DESCRIPTION OF THE DRAWINGS

FIG. 1 is a side elevational view of skimming apparatus according to the invention;

FIG. 2 is a top view of the apparatus shown in FIG. 1;

FIG. 3 is a sectional view taken substantially in the direction of arrows 3—3 of FIG. 2;

FIG. 4 is an enlarged fragmentary view of a portion of FIG. 3;

FIG. 5 is a sectional view taken substantially in the direction of arrows 5—5 of FIG. 2;

FIG. 6 is an enlarged fragmentary view of one component of the invention; and

FIG. 7 is a diagrammatic view showing the apparatus in operation.

DESCRIPTION OF THE PREFERRED EMBODIMENTS

Referring to the drawings, the skimming device is shown comprising a separating chamber 10, supporting pontoons 11 and 12, a vaned impeller 13, a motor 14 for driving the impeller, a weir 15 terminating the front end of the separating chamber, a pair of wings 16 and 17 for directing liquid, for example, water and oil, into the device, and an outboard engine 18 for moving the device slowly through the water.

Throughout this specification and claims it will be understood that references to water and oil as the liquids involved are intended to include other liquid bodies and liquids floating thereon.

The separating chamber 10 consists of a primary separating portion 19 and a secondary separating portion 21, separated by a baffle 22 or the like near the lower end of which there is an opening 23 for liquid to flow from primary portion 19 to secondary portion 21. The rear of secondary portion 21 is closed as by panel 24, near the lower end of which is an opening 25 for liquid to flow out of the separating chamber 10 and into the surrounding body of water. Adjacent the opening 25 is a further baffle 26 which extends upwardly into secondary portion 21 to a height greater than the opening 25. By virtue of this construction, water flowing into secondary portion 21 through opening 23 cannot pass directly outwardly through opening 25. Such water must flow over the top of baffle 26, thereby enabling entrained oil to separate out and float to the top of the water in secondary portion 21.

The forward portion 19 of the separating chamber 10 is closed as by a panel 27, which is shown extending angularly to the bottom panel 28 of the chamber, and terminates in the weir 15. The weir 15 has an upper edge 29 and a forwardly extending curved surface 31. Hinged to the forward edge of the curved surface 31, as by a hinge 32, is a skimming plane 33, which is adjustably upwardly and downwardly by a threaded rod 34 and a nut 35, welded, for example, to the skimming plane. The rod 34 may be rotated by a handwheel 36 and belt 37 or the like.

The separating chamber 10 may be closed at its sides by a pair of metal side members 38 and 39 which may extend the full length of the device from the rear panel 24 to the front extremity of the skimming plane 33.

The vaned rotary impeller 13 is forwardly disposed of the weir 15 and comprises drum 42 or the like, and a series of vanes 43. As may be seen best in FIG. 6, the vanes 43 extend across the full length of the drum, being held thereto as by welding, for example, and include the slightly curved or angular portions 44 and 45 at the ends. The vanes 43 extend radially from the surface of the drum and have a radius such as to just easily clear the curved surface 31 of the weir. The curved surface 31, over a substantial portion of its extent, has a radius of curvature substantially equal that of the vanes, but it will be understood that other shapes may be used for the forward surface 31 so long as the liquid is carried over the weir without excessive leakage or turbulence. The impeller 41 is supported by means of its shaft 46 in suitable bearings, not shown, on the side members 38 and 39. A pulley 47 and a belt 48 may be provided for driving the impeller from motor or engine 4 disposed on a suitable support platform 49.

The structure as described is adapted to be disposed in a body of water from which it is desired to skim, or remove, a floating film or surface of oil, for example, and is supported in such a body of water by means of the pontoon members 11 and 12 which are attached to the side members 38 and 39, respectively, by means of surrounding metallic straps 51, 52, 53 and 54, the ends of the straps being held to the side by bolts, for example, as shown. Other attaching means may, of course, be used, it being necessary only to be able to support the apparatus in the water adequately for the purpose intended.

The pontoon member 11 is divided into two sections 55 and 56 as by a wall or barrier 57, and pontoon member 12 is divided into two sections 58 and 59 as by a wall or barrier 61. At the underside of each pontoon section 55, 56, 58 and 59 there is an opening 62 (FIG. 1) in order that water may enter for control of the height of the separator in the body of water. At the top surface of pontoon sections 55, 56, 58 and 59, respectively, there are valves 63, 64, 65 and 66, as well as appropriate couplings and pipes, by means of which it is possible to permit air to flow out of each pontoon section and to permit water to flow into that pontoon section through the appropriate opening 62. In this manner, the height, or level, of the device in the water can be controlled, as well as its fore-and-aft and side-to-side trim. A pump 60, shown schematically, is provided for pumping air into any one of the pontoon sections for altering the trim and/or height of the device in the water.

As shown in FIGS. 1, 3 and 4, the device, when placed in a body of water, should assume a level relative to the body of water, illustrated by the wavy line 67. In this position the front end of the skimming plane 33 will be slightly underneath the interface 68 of the oil, for example, and water. At this level, a substantial portion of the radial extent of each vane 43 projects into the water when the particular vane is in the vertical position as shown by vane 43a in FIG. 4. As the vanes 43 rotate in the direction of arrow A, the water and oil film, or the mixture of oil and water, is carried up the curved surface 31 of the weir and over the top edge 29 thereof, into the primary separating portion 19. The end edges 44 and 45 of each vane serve, along with the vane proper and the cooperating surface of the drum, as a form of container for confining the oil and water until it flows over the top of the weir. Inasmuch as the top edge 29 of the weir is higher than the level of the water outside, a hydrostatic head is developed inside of separating chamber 10 and the primary separating portion 19 which causes water to flow through opening 23 and through opening 25, back into the body of water.

The primary separating chamber 19 is of sufficient size, for example, to hold several thousand gallons, so that the oil and water carried into the chamber becomes quiescent, and consequently, the oil separates out and flats to the top, and the separated water flows outwardly. Any additional entrained oil which does not separate out in the primary separating chamber 19, will separate out in secondary chamber 21, inasmuch as this chamber may be of about the same size, or perhaps smaller than primary chamber 19. A further quiescent state of the oil and water is created whereby the oil separates and floats to the top while the water flows outwardly through opening 25.

The height 29 of the weir may be selected in accordance with particular circumstances, but probably need not be any higher than a foot above the surface of the water in which the device is being used to create the necessary hydrostatic head, the weir preventing the splashing of oil and water back against the vanes 43, once the mixture has flowed into the primary separating chamber. One source of undesired turbulence is, thus, eliminated. The weir also enables the oil and water in chamber 19 to stay there when the device pitches and rolls a small amount along with the waves in the water body. The front wall 27 of the separating chamber 10 is shown at an angle in order to assist the movement of the device through the water without creating turbulence and/or waves which would interfere with the efficiency of the operation.

The dimensions of the impeller 41 may be chosen to suit particular circumstances, but a drum of about the size of a conventional oil drum is practical. From the surface of the drum, the vanes 43 could project about 4 inches, for example, there being conveniently about 15 vanes, 24° apart, on the surface of the drum. The axis of the drum may be so located relative to the top edge 29 of the weir that the angle $\theta$, as seen in FIG. 4, will be about 72°. In this manner, whenever a vane reaches the radial line extending from the drum axis to the top of the weir, the vane remains at a downwardly directed angle so that the oil and water flow readily outwardly and into the separating chamber. With the construction as described, three vanes are in the oil and water mixture as it enters the device at all times, thereby enabling the oil and water mixture to be carried up with a minimum of turbulence. The rotary speed of the drum is selected and coordinated with the forward speed of the device through the water in order to create a minimum of turbulence. The impeller vanes should avoid as much as possible slapping and splashing of the oil and water, in order to prevent the emulsification of the two liquids with consequent delays in separation of the two after flowing into the separating chamber. Preferably, the rotary speed of the impeller 46, the number of vanes 43 and the speed of the craft through the water should be such that the oil and water mixture is carried up and over the weir instead of being splashed or thrown over. Too few vanes may result in excessive flow away from the leading edge before reaching the top of the weir or require too high a rotary velocity to slap the mixture up and over the weir. These conditions are inefficient and creative of turbulence, both undesirable. Too many vanes obviously means that one does little work.

The skimming plane 33 may be adjusted by means of the threaded rod 34 in order to aid in selecting the proper depth at which to pick up a layer of water and the oil floating thereon. Accurate adjustment of the height and trim is necessary. It is desired that the minimum amount of water needed be picked up, while at the same time, it is realized that a substantial amount of water must be picked up in order to obtain the oil floating on its surface. If the depth of the skimming plane 33 and the connecting edge of the weir surface 31 at the hinge 32 should be just at the oil and water interface, only oil would be picked up, but any slight tilt of the craft, or change in height, as due to wave action, would result in oil being missed. Moreover, the amount of oil reached by each vane would be so small as not to give sufficient volume of liquid for the vane to carry. In this case, even the small clearance between the edge of the vanes and the weir surface needed to operate will result in a loss of oil back to the contaminated water. A minimum but substantial amount of water is needed to be picked up as a vehicle for carrying the oil by the vanes. This basic and important height at which the whole craft floats in the water for efficient operation determines the height of the skimming plane and the front edge of the weir below the liquid interface and is determined, as already indicated, by controlling the level of water in the pontoons. The angle of the skimming plane 33 is selected along with this basic height to achieve the most effective operation. In FIGS. 3 and 4 the relative thickness of oil and water are shown diagrammatically. Actual thickness will be determined in practice.

The craft may be stationarily mounted in a flume where the water is moving by virtue of its own momentum, or it may be used in a stream or lake where it may be necessary to slowly move the device through the water as by an outboard motor 18, for example, see FIG. 7. As another alternative, an oil boom 69 may be used to slowly bring in a slick of oil to the device and, if desired, the device could be towed through a body of water. The water and oil must reach the rotating vanes 43.

If the device is moved through the water too rapidly, or if the impeller 41 is rotating too slowly, the oil and water will pile up in front of the craft in the form of induced waves and the oil will tend to go around or under the craft instead of into it. The water-oil mixture will also be unduly agitated, resulting in more difficult skimming and separation.

The angle of the skimming plane 33 should not be overly steep, inasmuch as too great an amount of water will be picked up and yet, it can be at some small angle so as to be certain to pick up all of the oil.

The wings 16 and 17 enable the craft to funnel a slick of oil into the device as it is moved through the water.

After the device has been in operation for a time, the primary separating chamber 19 will be essentially full of oil, reaching down to the opening 23 in baffle 22. At this point, the craft should be taken to shore and the primary chamber pumped out of its oil, or a barge or the like may be brought alongside and the oil chamber emptied into that. If some form of continuous pumping out of oil is desired, a trough 71 may be disposed inside of primary separating chamber 19 and attached to baffle 22. A pipe 72 may extend from trough 71 for pumping oil therefrom and into some barge or the like.

A platform 73 may be disposed over the top of the craft for an operator to stand thereon, and a splash guard 74 may be provided for preventing splashing of oil and/or water away from impeller 13.

The motor or engine 14 may be electric, if the device is to be used adjacent the shore or in some appropriate stationary location, otherwise the motor 14, as well as the outboard motor 18, can be of the internal combustion engine type. Speed control means are associated with each of motors 14 and 18 so that the impeller 13 may be driven at an appropriate speed and the craft itself may be driven at an appropriate speed, both as described.

While a particular embodiment of the invention has been shown, it will be understood, of course, that the invention is not limited thereto since many modifications may be made, and it is, therefore, contemplated to cover any such modifications as fall within the true spirit and scope of the invention.

The invention having thus been described, what is claimed and desired to be secured by the Letters Patent is:

1. Apparatus for separating liquid floating on the surface of a body of water from the water and returning the separated water to the body of water, comprising a separating chamber for disposition in such body of water and having an upper portion and a lower portion, said upper portion being adapted to be above the surface of the body of water by a predetermined amount and said lower portion being adapted to be maintained below the surface of said body of water by a predetermined amount, said chamber being in communication at its lower portion with said body of water, a weir terminating the forward side of said chamber and having an upper edge which is adapted to be disposed a predetermined distance above the surface of said body of water to provide a hydrostatic head in said chamber for causing flow of water out of said chamber through said communication, said chamber and at least a portion of said body of water being movable relative to each other whereby the direction of relative water movement is over the upper edge of said weir and into said chamber, a rotatable impeller having transverse radial vanes thereon and having an axis transversely of said direction of movement attached to said chamber forwardly of said weir for impelling said floating liquid and water over said weir and into said chamber, means for relatively nonturbulently rotating said impeller, said weir having a forward surface which is curved with a radius approximating the radius of said impeller and which extends to the point where the lowermost vane of said impeller is essentially in the vertical position, the axis of said impeller being located such that said vanes just easily clear the said forward surface of said weir, and the forward edge of said weir being adapted to be disposed an effective minimum distance below the interface of said floating liquid and said body of water.

2. The invention according to claim 1 characterized in that the angle of the line from the top of the said weir and the axis of said impeller is less than 90° from the vertical diameter of the impeller.

3. The invention according to claim 1 characterized in that the vanes on said impeller are separated from each other by about 24° and the angle of the line from the top of the said weir and the axis of said impeller is about 72°.

4. The invention according to claim 1 characterized in that attached to the forward end of said curved weir there is a skimming plane.

5. The invention according to claim 4 characterized in that the forward end of said skimming plane is adjustable in height relative to the forward end of the curved weir.

6. The invention according to claim 1 characterized in that each end of said vanes includes an extension directed toward the direction of impeller rotation.

7. The invention according to claim 1 characterized in that said separating apparatus includes two pontoon members, one on each side of said apparatus, for supporting the said apparatus at the predetermined level in said body of water.

8. The invention according to claim 7 characterized in that each one of said pontoon members includes separate forward and rearward sections for controlling the fore-and-aft trim of said apparatus.

9. The invention according to claim 8 characterized in that said pontoon members include means for controlling the water level therein.

10. The invention according to claim 8 characterized in that each pontoon section includes an opening to the body of water and means for controlling the ingress and egress of air.

11. The invention according to claim 1 characterized in that the separating chamber includes a primary chamber, a secondary chamber, and means permitting liquid flow between said primary and secondary chambers at the lower extremity thereof, and in that the communication from the separating chamber to the body of water is from said secondary chamber at a point remote from said flow-permitting means.

12. The invention according to claim 11 characterized in that there is included a baffle in said secondary chamber between the flow-permitting means and the communication from said secondary chamber to the body of water.

13. The invention according to claim 1 characterized in that said impeller includes a cylindrical drum which is substantially concentric with the curved forward surface of said weir and said vanes extend from the surface of said drum.

14. Apparatus for separating liquid floating on the surface of a body of water from the water and returning the separated water to the body of water, comprising a separating chamber for disposition in such body of water and having an upper portion and a lower portion, said upper portion being adapted to be above the surface of the body of water by a predetermined amount and said lower portion being adapted to be maintained below the surface of said body of water by a predetermined amount, a wall terminating the rear of said chamber and having an opening at its lower portion for communication with said body of water, a weir terminating the front of said chamber, a baffle member between said wall and said weir and having an opening at its lower end for permitting flow therethrough, said weir having an upper edge which is adapted to be disposed a predetermined distance above the surface of said body of water to provide a hydrostatic head in said chamber for causing flow of water through the opening in said baffle member and through the opening in said rear wall, said chamber and at least a portion of said body of water being movable relative to each other whereby the direction of relative water movement is over the upper edge of said weir and into said chamber, a rotatable impeller having transverse radial vanes thereon and having an axis transversely of said direction of movement attached to said chamber forwardly of said weir for impelling said floating liquid and water over said weir and into said chamber, means for relatively nonturbulently rotating said impeller, said weir having a forward surface which is curved with a radius approximating the radius of said impeller and which extends to the point where the lowermost vane of said impeller is essentially in the vertical position, the axis of said impeller being located such that said vanes just easily clear the said curved forward surface of said weir, and the forward edge of said weir being adapted to be disposed an effective minimum distance below the interface of said floating liquid and said body of water.

15. The invention according to claim 14 characterized in that there is included a low-level flow control baffle between the opening at the lower end of said baffle member and the opening in said rear wall.

16. The invention according to claim 14 characterized in that there is attached to the baffle member on the rotatable impeller side and below the liquid level in said chamber a trough for collecting said floating liquid.

17. The invention according to claim 14 characterized in that there is included means for removing floating liquid from said trough.

* * * * *